(12) United States Patent
Katzer et al.

(10) Patent No.: US 11,416,467 B1
(45) Date of Patent: Aug. 16, 2022

(54) DATABASE ARCHITECTURE FOR REDUCING THE BURDEN ON AN ON-DISK DATABASE

(71) Applicant: T-MOBILE INNOVATIONS LLC, Overland Park, KS (US)

(72) Inventors: Robin Dale Katzer, Louisburg, KS (US); Deepthi Kota, Overland Park, KS (US); Vijayendra Nannapaneni, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 130 days.

(21) Appl. No.: 16/841,388

(22) Filed: Apr. 6, 2020

(51) Int. Cl.
*G06F 16/22* (2019.01)
*G06F 16/25* (2019.01)
*G06F 9/54* (2006.01)

(52) U.S. Cl.
CPC ............ *G06F 16/2282* (2019.01); *G06F 9/54* (2013.01); *G06F 16/252* (2019.01)

(58) Field of Classification Search
None
See application file for complete search history.

(56) References Cited

U.S. PATENT DOCUMENTS

| | | | |
|---|---|---|---|
| 6,751,463 B1 * | 6/2004 | Lorello | H04L 51/22 455/466 |
| 7,986,935 B1 | 7/2011 | D'Souza et al. | |
| 8,204,794 B1 | 6/2012 | Peng et al. | |
| 9,213,941 B2 * | 12/2015 | Petersen | G06Q 10/107 |
| 10,334,292 B1 * | 6/2019 | Harvey | H04N 7/14 |
| 10,552,747 B2 * | 2/2020 | Petersen | G06N 5/04 |
| 11,037,218 B1 | 6/2021 | Coleman et al. | |
| 2007/0198631 A1 | 8/2007 | Uhlmann | |
| 2010/0145838 A1 * | 6/2010 | Shi | H04L 12/1467 705/30 |
| 2013/0246212 A1 | 9/2013 | Sullivan | |
| 2014/0024348 A1 | 1/2014 | Hurst et al. | |
| 2015/0025919 A1 | 1/2015 | West | |
| 2015/0235270 A1 | 8/2015 | Partida | |

(Continued)

OTHER PUBLICATIONS

Office Action dated Nov. 12, 2020, U.S. Appl. No. 16/431,550, filed Jun. 4, 2019.

(Continued)

*Primary Examiner* — Kim T Nguyen

(57) ABSTRACT

An electronic device reservation system that reduces the burden on an on-disk database is disclosed that comprises an on-disk database including a reservation table and an in-memory database storing a count of available electronic devices for each type of electronic device. The system also comprises a server comprising one or more application programming interfaces configured to receive a reservation request for a type of electronic device, access the in-memory database to determine whether there is enough inventory, modify the reservation table in the on-disk database for the reservation request in response to determining that there is enough inventory, decrement the count of available electronic devices for the type of electronic device in the in-memory database in response to the modification, and send a notification to a subscriber indicating that they have reserved a place in line electronically for a pre-order of the requested type of electronic device.

20 Claims, 8 Drawing Sheets

(56) References Cited

U.S. PATENT DOCUMENTS

| | | | | |
|---|---|---|---|---|
| 2015/0302301 A1* | 10/2015 | Petersen | .............. | G06Q 10/107 |
| | | | | 706/11 |
| 2016/0162791 A1* | 6/2016 | Petersen | .............. | G06Q 10/107 |
| | | | | 706/11 |
| 2020/0020194 A1* | 1/2020 | Higgins | .............. | G07F 17/3237 |

OTHER PUBLICATIONS

Notice of Allowance dated Feb. 25, 2021, U.S. Appl. No. 16/431,550, filed Jun. 4, 2019.
ICT Monitor Worldwide, "Third-Party Retailers and Carriers Offering iPhone X Pre-Orders Tonight", https://dialog.proquest.com/professional/docview/1956164134?accountid=13144, last accessed Oct. 27, 2017.
Marquardt, Ronald R., et al., "Multi-tier Identities in an RFID Chip," filed Dec. 8, 2020, U.S. Appl. No. 17/115,596.
Coleman, Lisa, et al., "Prioritized Ordering System and Method," filed Jun. 4, 2019, U.S. Appl. No. 16/431,550.

* cited by examiner

US 11,416,467 B1

DATABASE ARCHITECTURE FOR REDUCING THE BURDEN ON AN ON-DISK DATABASE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data may be stored in different databases. For example, data may be stored in an in-memory database, an on-disk database, or a different type of database. An in-memory database is a database management system that primarily relies on main memory for computer data storage. In contrast, an on-disk database is a database management system that employs a disk storage mechanism.

SUMMARY

In an embodiment, an electronic device reservation system that reduces the burden on an on-disk database is disclosed. The system comprises an on-disk database comprising a reservation table and an in-memory database that stores a count of available electronic devices for each type of electronic device. The count of available electronic devices for each type of electronic device is initially determined based on information in the reservation table. The system also comprises a server comprising one or more application programming interfaces stored in a non-transitory memory of the server, that when executed by a processor of the server receive a reservation request for a particular type of electronic device from a requesting electronic device associated with a subscriber prior to a pre-order period, access the in-memory database to determine, based on the count of available electronic devices for the particular type of electronic device, whether there is enough inventory of the particular type of electronic device to accommodate the reservation request, and in response to a determination that there is enough inventory of the particular type of electronic device to accommodate the reservation request based on the access to the in-memory database, modify the reservation table in the on-disk database by adding a row for the reservation request that indicates the particular type of electronic device as associated with the subscriber and a priority status value. The one or more application programming interfaces are also configured to in response to modifying the reservation table in the on-disk database, decrement the count of available electronic devices for the particular type of electronic device stored in the in-memory database, and send a notification to the subscriber indicating that the subscriber has reserved a place in line electronically for a pre-order of the particular type of electronic device.

In another embodiment, a method for reserving an electronic device that reduces the burden on an on-disk database is disclosed. Each step of the method is performed by one or more application programming interfaces stored in a non-transitory memory of a server and executed by a processor of the server. The method comprises receiving a reservation request for a particular type of electronic device from a requesting electronic device associated with a subscriber prior to a pre-order period and accessing a count of available electronic devices for the particular type of electronic device in an in-memory database. The in-memory database stores a count of available electronic devices for each type of electronic device. The count of available electronic devices for each type of electronic device is initially determined based on information in a reservation table stored in an on-disk database. The method also comprises based on accessing the count of available electronic devices for the particular type of electronic device in the in-memory database, determining whether there is enough inventory of the particular type of electronic device to accommodate the reservation request and in response to a determination that there is enough inventory of the particular type of electronic device to accommodate the reservation request based on accessing the count of available electronic devices for the particular type of electronic device in the in-memory database, modifying the reservation table in the on-disk database by adding a row for the reservation request that indicates the particular type of electronic device as associated with the subscriber and a priority status value. The method further comprises in response to modifying the reservation table in the on-disk database, decrementing the count of available electronic devices for the particular type of electronic device stored in the in-memory database, and sending a notification to the subscriber indicating that the subscriber has reserved a place in line electronically for a pre-order of the particular type of electronic device.

In yet another embodiment, a method for reserving an electronic device that reduces the burden on an on-disk database is disclosed. Each step of the method is performed by one or more application programming interfaces stored in a non-transitory memory of a server and executed by a processor of the server. The method comprises receiving during a session a first reservation request for a first particular type of electronic device from a requesting electronic device associated with a subscriber prior to a pre-order period and accessing a count of available electronic devices for the first particular type of electronic device in an in-memory database. The in-memory database stores a count of available electronic devices for each type of electronic device. The count of available electronic devices for each type of electronic device is initially determined based on information in a reservation table stored in an on-disk database. The method also comprises based on accessing the count of available electronic devices for the first particular type of electronic device in the in-memory database, determining whether there is enough inventory of the first particular type of electronic device to accommodate the first reservation request, in response to a determination that there is enough inventory of the first particular type of electronic device to accommodate the first reservation request based on accessing the count of available electronic devices for the first particular type of electronic device in the in-memory database, modifying the reservation table in the on-disk database by adding a row for the first reservation request that indicates the first particular type of electronic device as associated with the subscriber and a first priority status value, and in response to modifying the reservation table in the on-disk database for the first reservation request, decrementing the count of available electronic devices for the first particular type of electronic device stored in the in-memory database. The method additionally comprises receiving during the session a second reservation request for a second particular type of electronic device from the requesting electronic device prior to the pre-order period, accessing a count of available electronic devices for the second particular type of electronic device in the in-memory database, and based on accessing the count of available electronic devices for the second particular type of electronic device in the in-memory database, determining whether there is enough inventory of the second particular type of electronic device to accommodate the second reservation request. The method also comprises determining that the first reservation request and the second reservation request occurred during the same session based on a common access token, and in response to a determination that there is enough inventory of the second particular type of electronic device to accommodate the second reservation request based on accessing the count of available electronic devices for the second particular type of electronic device in the in-memory database and in response to determining that the first reservation request and the second reservation request occurred during the same session based on the common access token, modifying the reservation table in the on-disk database by adding a row for the second reservation request and storing the row for the second reservation request as associated with the row for the first reservation request. The row for the second reservation request comprises a second priority status value. The method further comprises in response to modifying the reservation table in the on-disk database for the second reservation request, decrementing the count of available electronic devices for the second particular type of electronic device stored in the in-memory database, and sending one or more notifications to the subscriber indicating that the subscriber has reserved a place in line electronically for a pre-order of the first particular type of electronic device and a place in line electronically for a pre-order of the second particular type of electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
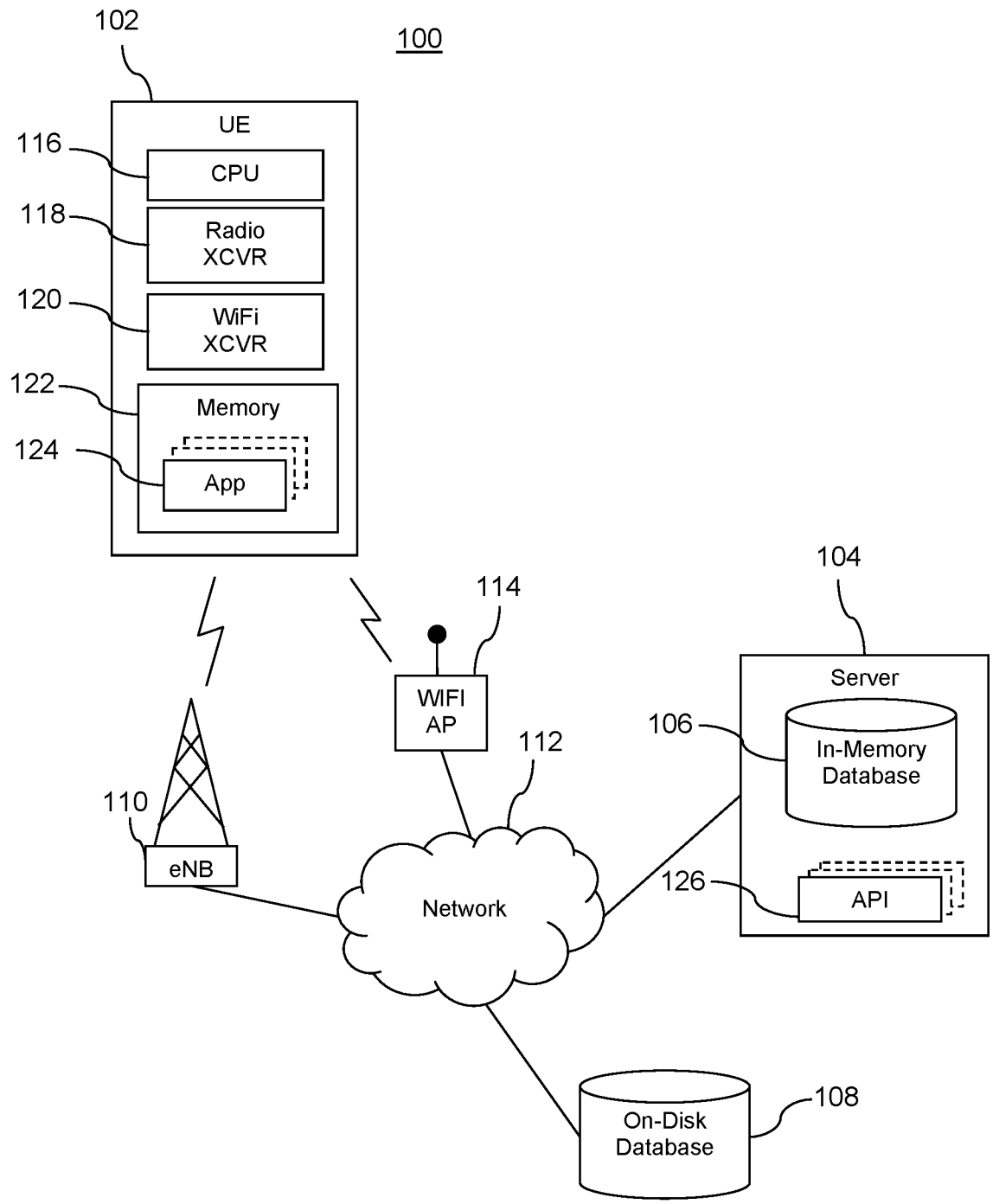
FIG. 1 is a block diagram of a wireless communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Often times when a new electronic device is launched, a wireless communication service subscriber may have to stay up late or wake up early on the pre-order date in order to pre-order the new electronic device online or travel to the network service provider's store or to the manufacturer's store and wait in line possibly overnight in order to place their pre-order in-person. This can be very burdensome to the subscriber. To minimize these burdens, a wireless communication service provider may offer a prioritized electronic device reservation system that allows a subscriber to reserve a place in line electronically to order a new electronic device during a launch. For further details on such a prioritized electronic device reservation system, see U.S. patent application Ser. No. 16/431,550, filed Jun. 4, 2019, titled "Prioritized Ordering System and Method," by Lisa Coleman, et al., which is incorporated by reference herein in its entirety.

The pending disclosure represents the engineering refinements that have been developed as the engineers have had more time to build the system as they want it to be and as desired to address observed shortcomings in the initial solution. In the initial solution, the system worked directly with an Oracle database (the system of record for inventory), and the Oracle database (i.e., an on-disk database) with a reservation table stored thereon was used to determine an inventory count as well as to store an association between each subscriber and the subscriber's desired new electronic device selection and a priority status value assigned to that subscriber, which indicates the subscriber's virtual relative place in line. However, during operation of the prioritized electronic device reservation system, use of the on-disk database had some undesired results. For example, every time a reservation request was received, the on-disk database would be accessed to determine an inventory count. This frequent querying of the on-disk database to determine inventory counts burdened the on-disk database. Further, since the initial solution used the system of record for inventory counts and since the inventory count must be serialized (i.e., single threaded to avoid collisions and corruptions of the count) in order to get an accurate count, rows in the on-disk database would become locked while one priority status transaction was taking place (the part of the transaction that committed an item of inventory) such that no new rows could be added, thereby creating a deadlock situation, which resulted in backlogs (e.g., slowing many other transactions underway) and slower completions for reservation requests. Also, if the Oracle database was used by other systems independent of the priority status function, the initial solution would have impacted those systems as well.

Thus, the pending application is directed to a database architecture for reducing the burden on the on-disk database (e.g., the Oracle database maintaining the inventory). To resolve the issues discussed above, a snapshot of inventory is taken and stored in a caching device, and then priority status inventory commitments are conducted with reference to that caching device, thereby avoiding the Oracle DB being locked during that isolated commit action. In particular, in order to offload the on-disk database, the database architecture disclosed herein uses an in-memory database to store a count of each type of electronic device. The count for each type of electronic device represents a count of remaining unreserved electronic devices for that particular type of electronic device. The count for each type of electronic device may be initially determined based on the reservation table stored on the in-disk database. However, rather than accessing the on-disk database to determine an inventory count each time a reservation request is received, the in-memory database is accessed instead. In addition to unburdening the on-disk database by reducing the number of queries to the on-disk database, the use of the in-memory database for inventory count queries also results in quicker response times.

Prior to a pre-order date of a new type of electronic device, a subscriber may be notified of the upcoming launch. The pending system supports not only releases of mobile phone devices but also releases of other devices such as watches and tablets, which is a user observable change over the initial solution. The subscriber may use their electronic device to send a reservation request for a particular type of electronic device via an installed application or through a website of the wireless communication service provider. An application programming interface (API) stored and executed by a server may receive the reservation request and access the in-memory database rather than the on-disk database to determine whether there is enough inventory of the requested particular type of electronic device to accommodate the reservation request. If there is enough inventory, the API (or a different API) may modify the reservation table in the on-disk database by adding a row for the reservation request. The added row may indicate the requested particular type of electronic device as associated with the subscriber as well as a priority status value indicating the subscriber's virtual relative place in line.

After modifying the reservation table, the API (or different APIs) may access the in-memory database and decrement the count of available electronic devices corresponding to the requested particular type of electronic device and notify the subscriber that they have reserved a place in line electronically for a pre-order of the requested particular type of electronic device. During the pre-order period, the subscriber may send a confirmation to proceed with the pre-order of the requested particular type of electronic device or a different particular type of electronic device if the subscriber issues a change request.

Another distinction over the initially developed solution is that during a single session, the subscriber can send multiple reservation requests for the same type or different types of electronic devices via different API calls. To accommodate this, after determining inventory counts and confirming enough inventory exists using the in-memory database as discussed above, an API creates a different row in the reservation table in the on-disk database for each of the reservation requests received during the single session. The API may be able to identify that the reservation requests occurred during the same session based on a common access token. Each of the different rows in the reservation table corresponding to the reservation requests received during the single session may be stored in the reservation table as associated to each other based on a common identifier. Each of the added rows may indicate the requested particular type of electronic device and a priority status value indicating the subscriber's virtual relative place in line for that particular reservation request. After each row has been added, the API (or a different API) decrements the corresponding inventory count in the in-memory database as discussed above. Further, one or more notifications may be sent to the subscriber indicating that the subscriber has reserved places in line electronically for a pre-order of each of the requested types of electronic devices.

Turning now to FIG. 1, a system 100 is described. In an embodiment, the system 100 comprises a user equipment (UE) 102, a server 104 comprising an in-memory database 106, an on-disk database 108, an eNodeB (eNB) 110, and a network 112. In an embodiment, the system 100 further comprises a WIFI access point 114 that is configured to establish a wireless communication link and provide communication connectivity to the network 112.

The UE 102 may comprise a processor 116, a radio transceiver 118, a WIFI transceiver 120, and a memory 122. The memory 122 may comprise a non-transitory memory portion that stores one or more client applications 124. The UE 102 may be a mobile phone, a smart phone, a watch, a personal digital assistant (PDA), a media player, a wearable computer, a headset computer, a laptop computer, a tablet computer, a notebook computer, or any combination thereof.

The UE 102 may be configured to use the radio transceiver 118 to establish a wireless communication link with the eNB 110 to provide access to the network 112. The radio transceiver 118 of the UE 102 may communicate with the eNB 110 using any of a variety of wireless communication protocols including a code division multiple access (CDMA) wireless communication protocol, a global system for mobile communication (GSM) wireless communication protocol, a long-term evolution (LTE) wireless communication protocol, or another wireless communication protocol. In some embodiments, the radio transceiver 118 of the UE 102 may communicate with the eNB 110 using a 5G wireless communication protocol. In some contexts, the eNB 110 may be referred to as a base transceiver station (BTS), a cell tower, or cell site. The UE 102 may also be configured to use the WIFI transceiver 120 to establish a wireless communication link with the WIFI access point 114 to provide access to the network 112. The network 112 may comprise one or more private networks, one or more public networks, or a combination thereof. For example, the network 112 may comprise a radio access network (RAN) of a telecommunications service provider. The UE 102 may access the network 112 to obtain a variety of communication services.

Prior to a pre-order period of a new type of electronic device, a subscriber may be notified of the upcoming launch. In some embodiments, the subscriber may be notified that they are eligible to upgrade their electronic device. A subscriber using the UE 102 may send a reservation request for a particular type of electronic device to the server 104 prior to the launch of the particular type of electronic device. For example, the reservation request may be sent via an installed application or through a website of the wireless communication service provider. In an embodiment, the reservation request is for a particular type of electronic device. The requested electronic device may comprise a mobile phone, a smart phone, a watch, a personal digital assistant (PDA), a media player, a wearable computer, a headset computer, a laptop computer, a tablet computer, a notebook computer, or a different electronic device. There may be different types of each electronic device in terms of their specific characteristics or features. The specific characteristics or features may comprise a specific color, a specific memory size, a specific screen size, a specific processor speed, and/or different specific characteristic or feature.

The server 104 may be associated with a telecommunications service provider. The server 104 may be a server computer. Server computers are discussed in more detail hereinafter. In an embodiment, the server 104 comprises one or more APIs 126. In an embodiment, the one or more APIs 126 are implemented using Mule APIs. An API of the one or more APIs 126 may receive the reservation request and access the in-memory database 106 rather than the on-disk database 108 to determine whether there is enough inventory of the requested particular type of electronic device to accommodate the reservation request. The in-memory database 106 may store a count of each of the different types of electronic devices available for pre-order. The count of each of the different types of electronic devices available for pre-order may be initially determined based on a reservation table stored in the on-disk database 108. Once the counts are initially determined and stored in the in-memory database 106, the on-disk database 108 may only be accessed again to determine remaining unreserved counts for storage in the in-memory database 106 if the cache in the in-memory database 106 is cleared for example because an issue arises with the server 104 on which the in-memory database 106 is located. The in-memory database 106 is a database management system that primarily relies on main memory for computer data storage. In an embodiment, the in-memory database 106 comprises a Redis database.

As discussed above, use of the in-memory database 106 to store a count of each type of electronic device offloads the on-disk database 108. In particular, rather than accessing the on-disk database 108 to determine an inventory count each time a reservation request is received, the in-memory database 106 is accessed instead. In addition to unburdening the on-disk database 108 by reducing the number of queries to the on-disk database 108, the use of the in-memory database 106 for inventory count queries also results in quicker response times.

If the response to the query to the in-memory database 106 indicates that there is enough inventory for the particular type of electronic device requested, an API of the one or more APIs 126 may modify the reservation table in the on-disk database 108 by adding a row for the reservation request. The added row may indicate the requested particular type of electronic device as associated with the subscriber as well as a priority status value indicating the subscriber's virtual relative place in line. For example, the added row may comprise a subscriber identifier, details regarding the requested particular type of electronic device, and the corresponding priority status value. The added row for the reservation request in reservation table may also comprise a channel identification that identifies a channel from which the reservation request was received.

In an embodiment, the priority status value is a numerical value corresponding to a relative place in line. The relative place in line is a value stored as a sequence of bits, rather than a physical location of that customer relative to other customers in line outside, for example, a storefront. The relative place in line symbolizes where that subscriber's priority status for his or her new electronic device is relative to other subscriber's new electronic devices during a pre-order. The relative place in line symbolizes where that network service provider's customer or subscriber is in line when pre-orders open.

The on-disk database 108 is a database management system that employs a disk storage mechanism. In an embodiment, the on-disk database 108 comprises an Oracle database.

After modifying the reservation table, an API of the one or more APIs 126 may access the in-memory database 106 and decrement the count of available electronic devices corresponding to the requested particular type of electronic device. Then an API of the one or more APIs 126 may notify the subscriber that they have reserved a place in line electronically for a pre-order of the requested particular type of electronic device. The subscriber may be notified via a user interface of an installed application, a user interface of a website of the wireless communication service provider, a short message service message, text message, an e-mail, an automated calling system, or another mechanism. In an embodiment, the notification sent to the subscriber comprises the priority status value. The notification sent to the subscriber may specify when the pre-orders open and/or that the order for the requested particular type of electronic device must be confirmed or submitted within a pre-determined time after the time when the pre-order opens. Alternatively, this information may be sent via a different notification.

Once the pre-order period opens, the subscriber may send a confirmation to proceed with the pre-order of the requested particular type of electronic device. In an embodiment, this confirmation needs to be received within the specified pre-determined time period in the one or more notifications received by the subscriber in order for the subscriber to be afforded their priority status value. Once the subscriber confirms the pre-order, a confirmation may be sent to an order fulfillment server, where the orders are taken, fulfilled, and a shipment notification is sent to the subscriber as to when he or she can anticipate receiving the ordered new electronic device or devices. Notification can also be sent for pickup at a designated location, such as the wireless communication service provider's nearby storefront.

After the priority status value is assigned, the subscriber may change their pre-order to a different particular type of electronic device by issuing a change request. For example, a subscriber may change their selections for their requested electronic device (e.g., different color, different screen size, different memory size, etc.). A subscriber using the UE 102 may send the change request prior to or during the pre-order period. The change request may be sent via an installed application or through a website of the wireless communication service provider. In an embodiment, the change request does not affect the previously assigned priority status value for that changed electronic device selection. Thus, the subscriber remains in the same position in line even after the characteristic or feature selections are changed all the way up to and including the pre-order date.

In response to receiving the change request to modify a selection to a different particular type of electronic device, an API of the one or more APIs 126 may access the in-memory database 106 rather than the on-disk database 108 to determine whether there is enough inventory of the requested different particular type of electronic device to accommodate the change request. If the response to the query to the in-memory database 106 indicates that there is enough inventory for the different particular type of electronic device requested, an API of the one or more APIs 126 may modify the row for the reservation request in the reservation table in the on-disk database 108 based on the change request to indicate the different particular type of electronic device as associated with the subscriber.

After modifying the reservation table, an API of the one or more APIs 126 may access the in-memory database 106 and increment the count of available electronic devices corresponding to the particular type of electronic device initially requested in the reservation request and decrement the count of available electronic devices corresponding to the different particular type of electronic device requested in the change request. An API of the one or more APIs 126 may notify the subscriber that the change request has been satisfied. In an embodiment, the subscriber sends a confirmation to proceed with the pre-order of the requested different particular type of electronic device during their pre-order period and a confirmation is sent to an order fulfillment server.

During a single session, the subscriber can send multiple reservation requests for the same type or different types of electronic devices via different API calls. To accommodate this, after determining inventory counts and confirming enough inventory exists using the in-memory database 106 instead of the on-disk database 108 as discussed above, an API of the one or more APIs 126 may create a different row in the reservation table in the on-disk database 108 for each of the reservation requests received during the single session. In an embodiment, the API of the one or more APIs 126 is able to identify that the reservation requests occurred during the same session based on a common access token. Each of the different rows in the reservation table corresponding to the reservation requests received during the single session may be stored in the reservation table as associated to each other based on a common identifier such as a billing account number and/or a subscriber identifier. Each of the added rows may indicate the requested particular type of electronic device and a priority status value indicating the subscriber's virtual relative place in line for that particular reservation request. In an embodiment, each reservation request received during the single session from the subscriber receives a different priority status value.

After each row has been added, an API of the one or more APIs 126 decrements the corresponding inventory count in the in-memory database 106 as discussed above. Further, an API of the one or more APIs 126 may send one or more notifications to the subscriber indicating that the subscriber has reserved places in line electronically for a pre-order of each of the requested types of electronic devices.

It is understood that any number of UEs 102, any number of servers 104, any number of in-memory databases 106, any number of on-disk databases 108, any number of eNBs 110, and any number of WIFI access points 114 may exist in the system 100. In an embodiment, the UE 102 may have other components, which are not shown, such as a near field communication (NFC), radio transceiver or other components.

Figure 2:
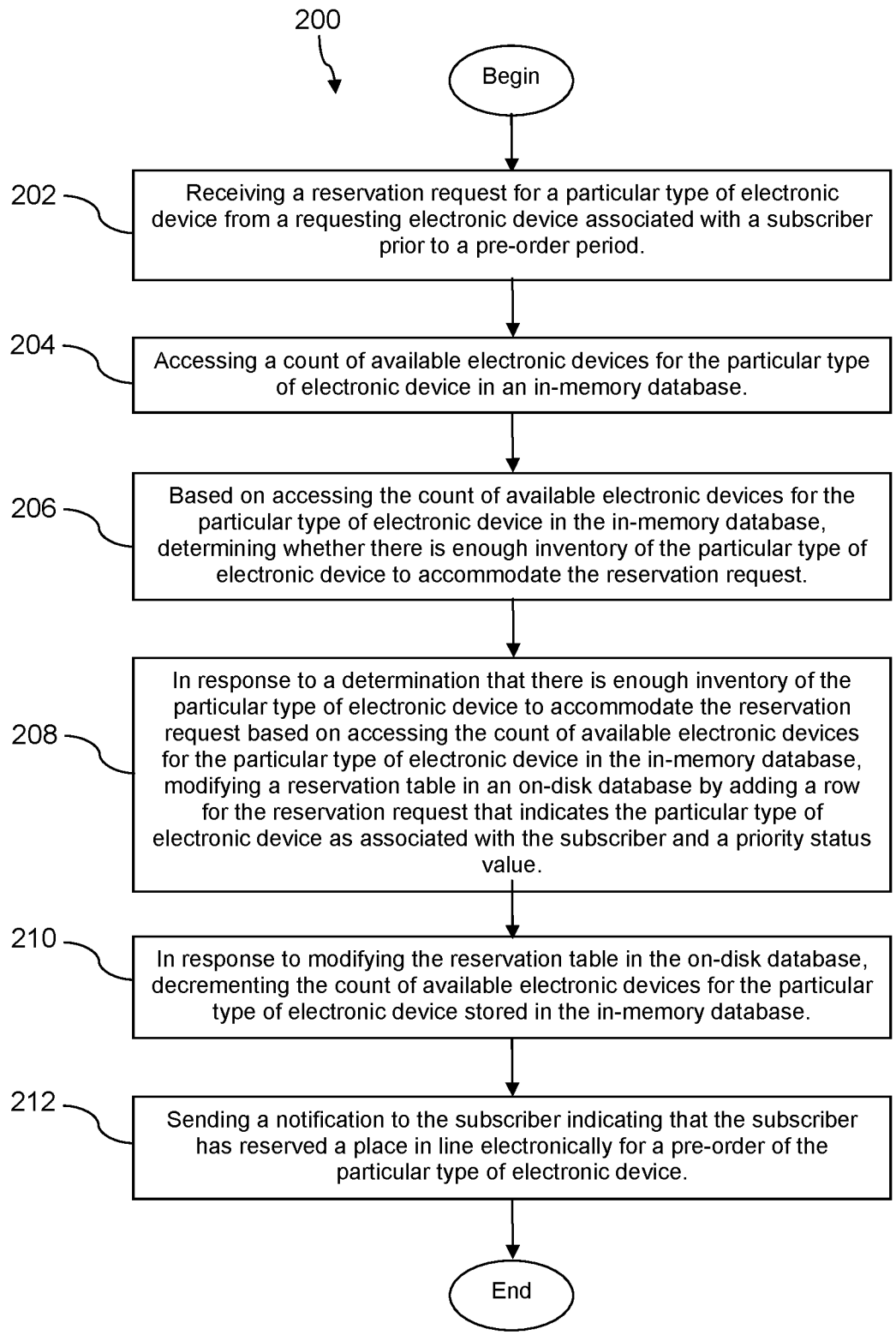
FIG. 2 is a flow chart of a method according to an embodiment of the disclosure.

Turning now to FIG. 2, a method 200 is described. Each step of method 200 may be performed by one or more APIs stored in a non-transitory memory of a server and executable by a processor of the server (e.g., one or more APIs of the APIs 126 stored and executed on the server 104). At block 202, one or more APIs receives a reservation request for a particular type of electronic device from a requesting electronic device associated with a subscriber prior to a pre-order period. At block 204, one or more APIs access a count of available electronic devices for the particular type of electronic device in an in-memory database (e.g., in-memory database 106). At block 206, based on accessing the count of available electronic devices for the particular type of electronic device in the in-memory database, one or more APIs determine whether there is enough inventory of the particular type of electronic device to accommodate the reservation request.

At block 208, in response to a determination that there is enough inventory of the particular type of electronic device to accommodate the reservation request based on accessing the count of available electronic devices for the particular type of electronic device in the in-memory database, one or more APIs modify a reservation table in an on-disk database (e.g., on-disk database 108) by adding a row for the reservation request that indicates the particular type of electronic device as associated with the subscriber and a priority status value. At block 210, in response to modifying the reservation table in the on-disk database, one or more APIs decrement the count of available electronic devices for the particular type of electronic device stored in the in-memory database. At block 212, one or more APIs send a notification to the subscriber indicating that the subscriber has reserved a place in line electronically for a pre-order of the particular type of electronic device.

Figure 3A:
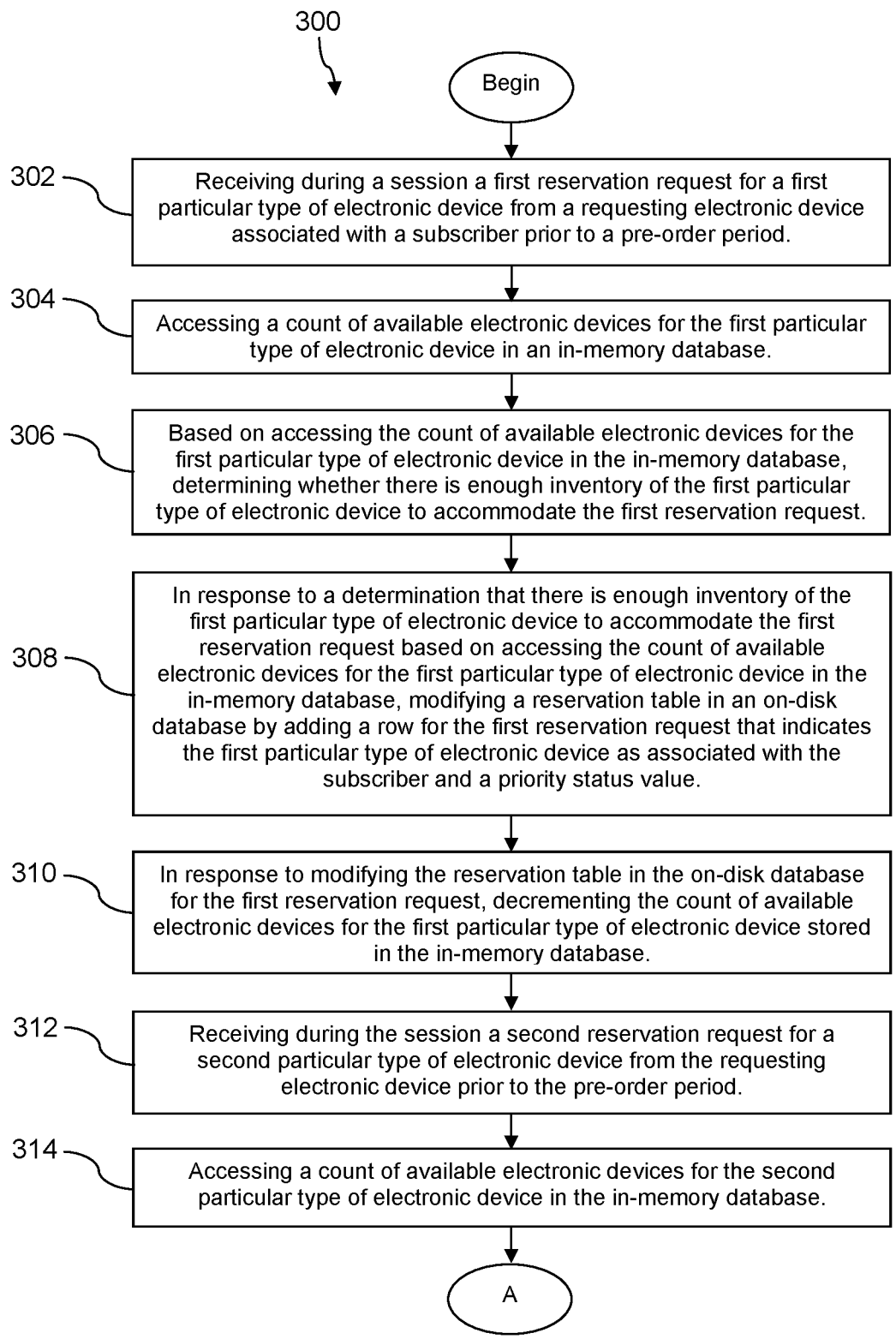
FIGS. 3A and 3B are a flow chart of another method according to an embodiment of the disclosure.
Figure 3B:
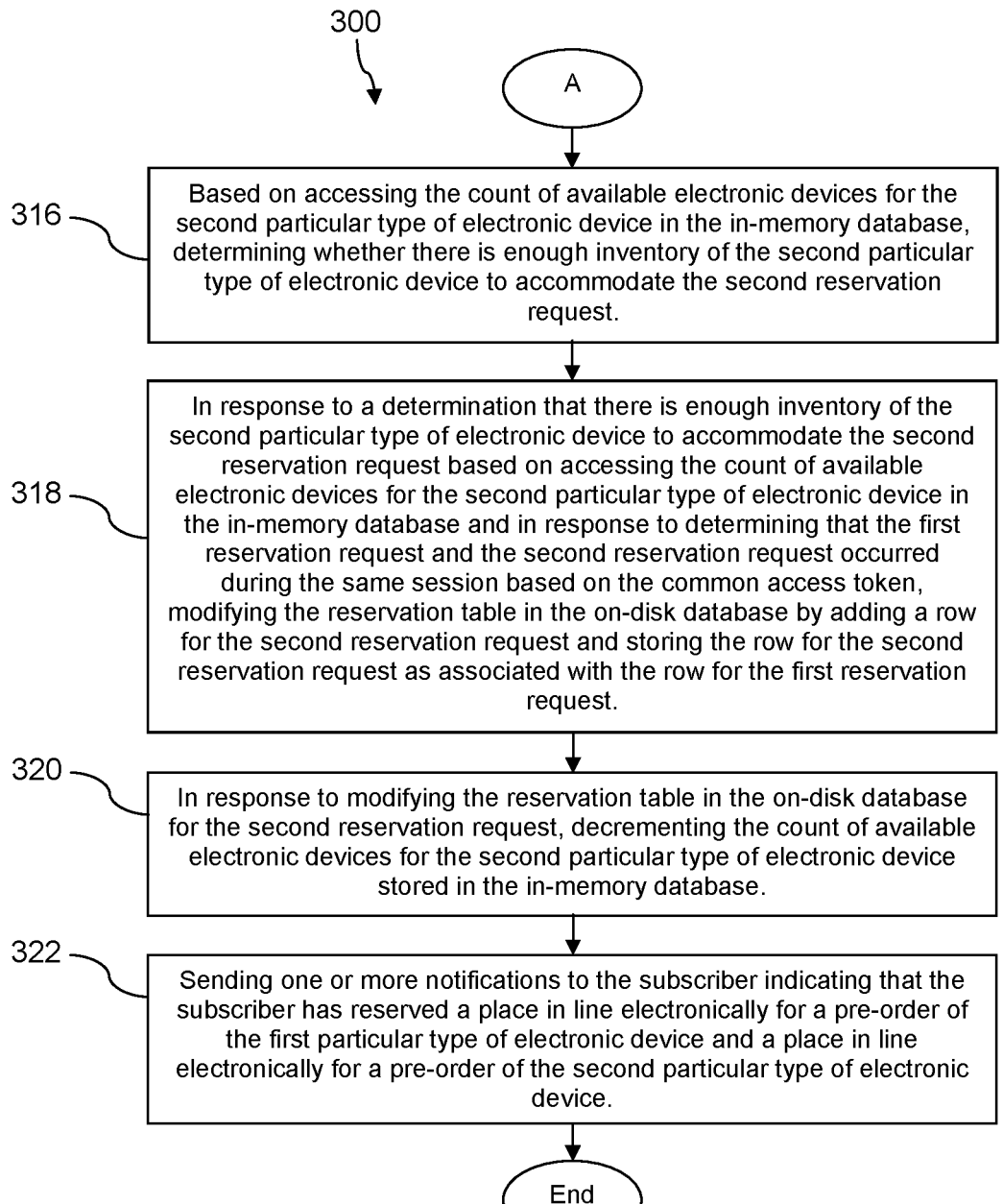

Turning now to FIG. 3, a method 300 is described. Each step of method 300 may be performed by one or more APIs stored in a non-transitory memory of a server and executable by a processor of the server (e.g., one or more APIs of the APIs 126 stored and executed on the server 104). At block 302, one or more APIs receive during a session a first reservation request for a first particular type of electronic device from a requesting electronic device associated with a subscriber prior to a pre-order period. At block 304, one or more APIs access a count of available electronic devices for the first particular type of electronic device in an in-memory database (e.g., in-memory database 106). At block 306, based on accessing the count of available electronic devices for the first particular type of electronic device in the in-memory database, one or more APIs determine whether there is enough inventory of the first particular type of electronic device to accommodate the first reservation request.

At block 308, in response to a determination that there is enough inventory of the first particular type of electronic device to accommodate the first reservation request based on accessing the count of available electronic devices for the first particular type of electronic device in the in-memory database, the one or more APIs modify a reservation table in an on-disk database (e.g., on-disk database 108) by adding a row for the first reservation request that indicates the first particular type of electronic device as associated with the subscriber and a priority status value. At block 310, in response to modifying the reservation table in the on-disk database for the first reservation request, one or more APIs decrement the count of available electronic devices for the first particular type of electronic device stored in the in-memory database.

At block 312, one or more APIs receive during the session a second reservation request for a second particular type of electronic device from the requesting electronic device prior to the pre-order period. At block 314, one or more APIs access a count of available electronic devices for the second particular type of electronic device in the in-memory database. At block 316, based on accessing the count of available electronic devices for the second particular type of electronic device in the in-memory database, one or more APIs determine whether there is enough inventory of the second particular type of electronic device to accommodate the second reservation request.

At block 318, in response to a determination that there is enough inventory of the second particular type of electronic device to accommodate the second reservation request based on accessing the count of available electronic devices for the second particular type of electronic device in the in-memory database and in response to determining that the first reservation request and the second reservation request occurred during the same session based on the common access token, one or more APIs modify the reservation table in the on-disk database by adding a row for the second reservation request and storing the row for the second reservation request as associated with the row for the first reservation request. At block 320, in response to modifying the reservation table in the on-disk database for the second reservation request, one or more APIs decrement the count of available electronic devices for the second particular type of electronic device stored in the in-memory database. At block 322, one or more APIs send one or more notifications to the subscriber indicating that the subscriber has reserved a place in line electronically for a pre-order of the first particular type of electronic device and a place in line electronically for a pre-order of the second particular type of electronic device.

Figure 4:
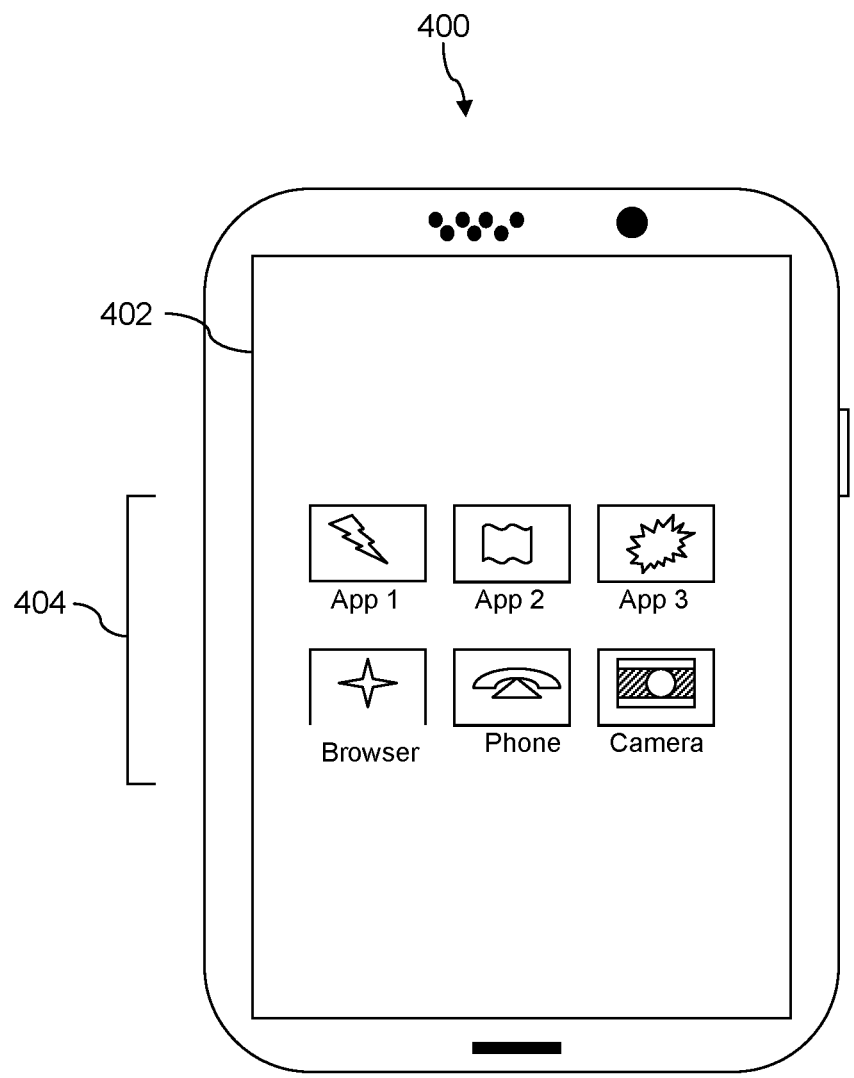
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
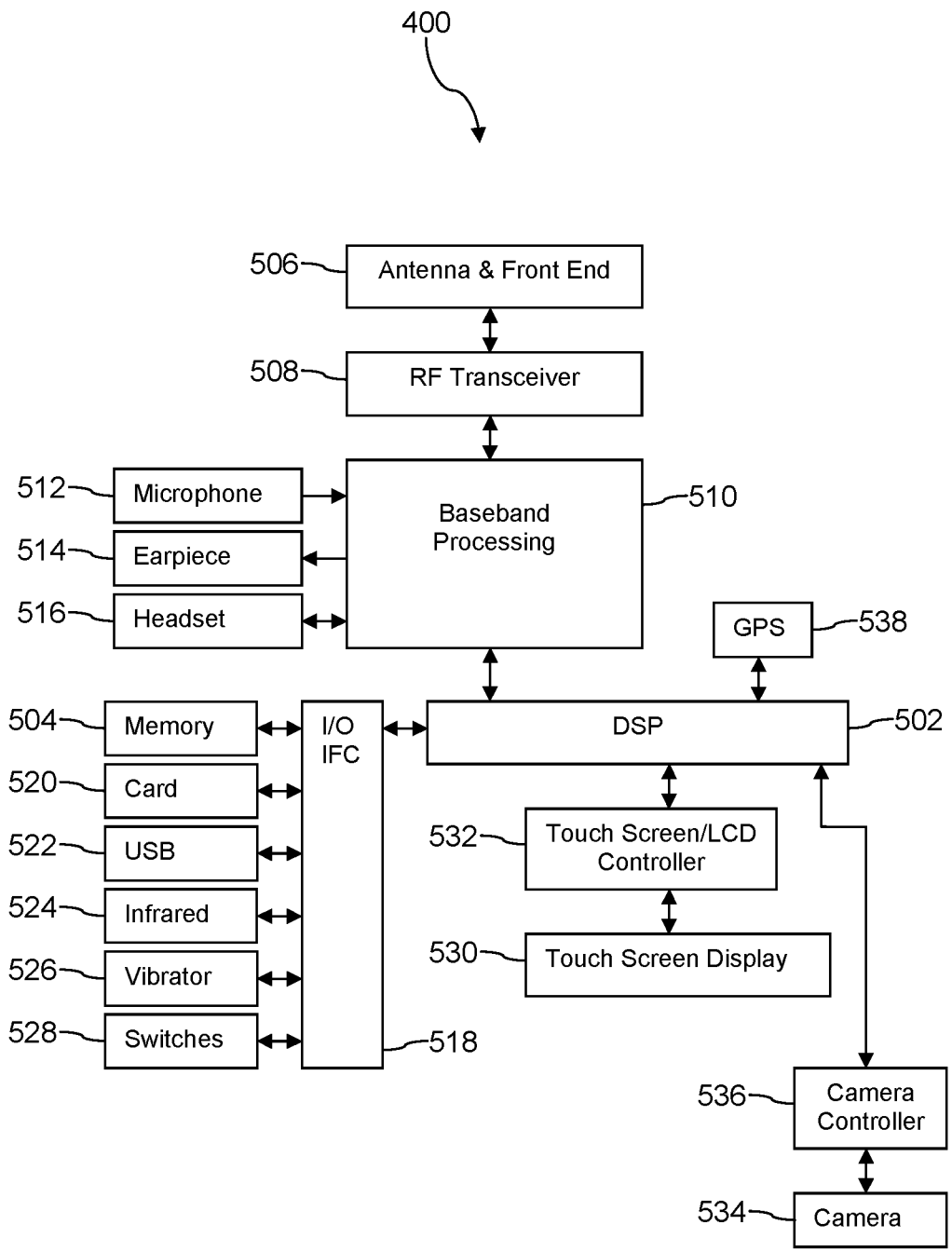
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
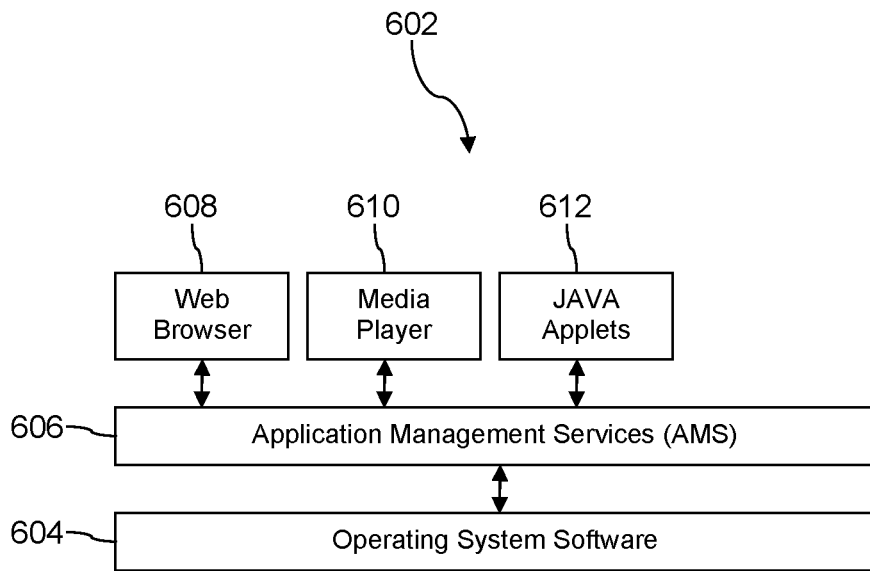
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
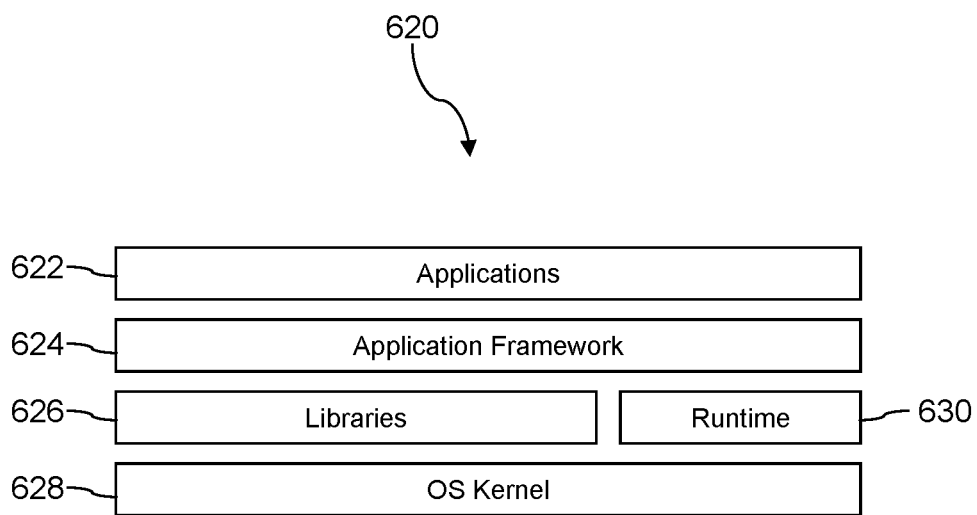
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
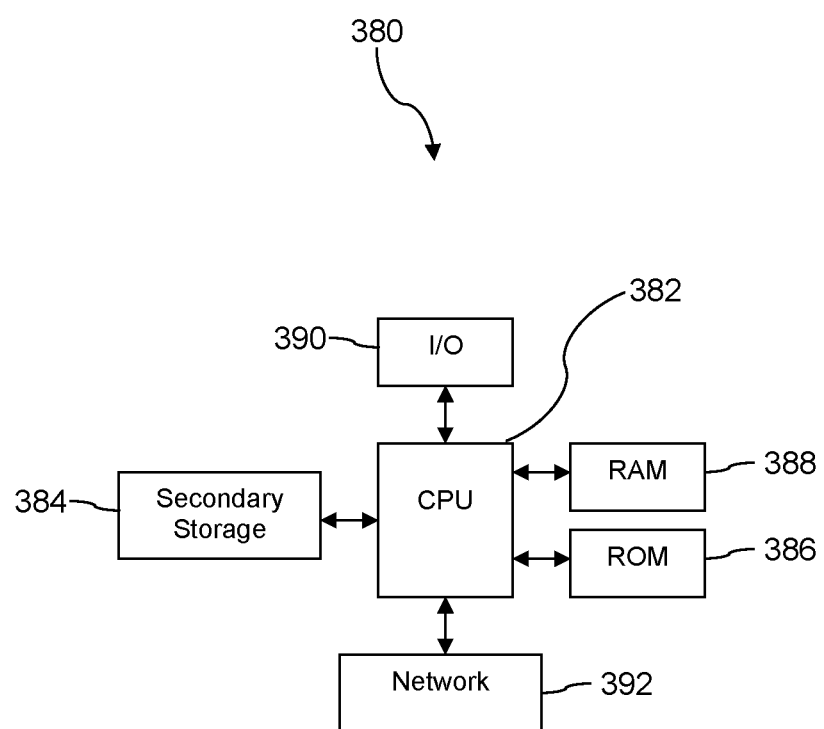
FIG. 7 is block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device reservation system that reduces the burden on an on-disk database, the system comprising:
an on-disk database comprising a reservation table;
an in-memory database that stores a count of available electronic devices for each type of electronic device, wherein the count of available electronic devices for each type of electronic device is initially determined based on information in the reservation table; and a server comprising one or more application programming interfaces stored in a non-transitory memory of the server, that when executed by a processor of the server:
receive a reservation request for a particular type of electronic device from a requesting electronic device associated with a subscriber prior to a pre-order period,
access the in-memory database to determine, based on the count of available electronic devices for the particular type of electronic device, whether there is enough inventory of the particular type of electronic device to accommodate the reservation request,
in response to a determination that there is enough inventory of the particular type of electronic device to accommodate the reservation request based on the access to the in-memory database, modify the reservation table in the on-disk database by adding a row for the reservation request that indicates the particular type of electronic device as associated with the subscriber and a priority status value,
in response to modifying the reservation table in the on-disk database, decrement the count of available electronic devices for the particular type of electronic device stored in the in-memory database, and
send a notification to the subscriber indicating that the subscriber has reserved a place in line electronically for a pre-order of the particular type of electronic device.

2. The electronic device reservation system of claim 1, wherein the one or more application programming interfaces are further configured to subsequently receive during the pre-order period a confirmation from the subscriber to proceed with the pre-order of the particular type of electronic device.

3. The electronic device reservation system of claim 1, wherein the one or more application programming interfaces are further configured to:
subsequently receive a change request from the subscriber to switch the pre-order of the particular type of electronic device to a different particular type of electronic device,
access the in-memory database to determine, based on the count of available electronic devices for the different particular type of electronic device, whether there is enough inventory of the different particular type of electronic device to accommodate the change request,
in response to a determination that there is enough inventory of the different particular type of electronic device to accommodate the change request based on the access to the in-memory database, modify the row for the reservation request in the reservation table in the on-disk database based on the change request to indicate the different particular type of electronic device as associated with the subscriber, and
in response to modifying the reservation table in the on-disk database, increment the count of available electronic devices for the particular type of electronic device and decrement the count of available electronic devices for the different particular type of electronic device stored in the in-memory database.

4. The electronic device reservation system of claim 1, wherein the row for the reservation request in the reservation table comprises a channel identification, and wherein the channel identification identifies a channel from which the reservation request was received.

5. The electronic device reservation system of claim 1, wherein the reservation request is received during a session via an application programming interface call, and wherein the one or more application programming interfaces are further configured to receive, during the session via one or more additional application programming interface calls, one or more additional reservation requests for one or more particular types of electronic device from the requesting electronic device prior to the pre-order period.

6. The electronic device reservation system of claim 5, wherein the one or more application programming interfaces are further configured to:
determine that the reservation request and the one or more additional reservation requests occurred during the same session based on a common access token, and
in response to the determination, modify the reservation table in the on-disk database by adding a row for each of the one or more additional reservation requests and storing each row for the one or more additional reservation requests as associated with the row for the reservation request.

7. The electronic device reservation system of claim 1, wherein the particular type of electronic device comprises a mobile phone, a smart phone, a watch, a personal digital assistant (PDA), a media player, a wearable computer, a headset computer, a laptop computer, a tablet computer, or a notebook computer with specific characteristics.

8. The electronic device reservation system of claim 7, wherein the specific characteristics comprise one or more of a color, a screen size, a memory size, or a speed of operation.

9. A method for reserving an electronic device that reduces the burden on an on-disk database, each step of the method performed by one or more application programming interfaces stored in a non-transitory memory of a server and executed by a processor of the server, the method comprising:
receiving a reservation request for a particular type of electronic device from a requesting electronic device associated with a subscriber prior to a pre-order period;
accessing a count of available electronic devices for the particular type of electronic device in an in-memory database, wherein the in-memory database stores a count of available electronic devices for each type of electronic device, and wherein the count of available electronic devices for each type of electronic device is initially determined based on information in a reservation table stored in an on-disk database;
based on accessing the count of available electronic devices for the particular type of electronic device in the in-memory database, determining whether there is enough inventory of the particular type of electronic device to accommodate the reservation request;
in response to a determination that there is enough inventory of the particular type of electronic device to accommodate the reservation request based on accessing the count of available electronic devices for the particular type of electronic device in the in-memory database, modifying the reservation table in the on-disk database by adding a row for the reservation request that indicates the particular type of electronic device as associated with the subscriber and a priority status value;
in response to modifying the reservation table in the on-disk database, decrementing the count of available electronic devices for the particular type of electronic device stored in the in-memory database; and sending a notification to the subscriber indicating that the subscriber has reserved a place in line electronically for a pre-order of the particular type of electronic device.

10. The method of claim 9, further comprising subsequently receiving during the pre-order period a confirmation from the subscriber to proceed with the pre-order of the particular type of electronic device.

11. The method of claim 9, further comprising:
subsequently receiving a change request from the subscriber to switch the pre-order of the particular type of electronic device to a different particular type of electronic device;
accessing the count of available electronic devices for the different particular type of electronic device in the in-memory database;
based on accessing the count of available electronic devices for the different particular type of electronic device in the in-memory database, determining whether there is enough inventory of the different particular type of electronic device to accommodate the change request;
in response to a determination that there is enough inventory of the different particular type of electronic device to accommodate the change request based on accessing the count of available electronic devices for the different particular type of electronic device in the in-memory database, modifying the row for the reservation request in the reservation table in the on-disk database based on the change request to indicate the different particular type of electronic device as associated with the subscriber;
in response to modifying the reservation table in the on-disk database, incrementing the count of available electronic devices for the particular type of electronic device and decrementing the count of available electronic devices for the different particular type of electronic device stored in the in-memory database.

12. The method of claim 9, wherein the reservation request is received via a session via an application programming interface call, and further comprising receiving, during the session via one or more additional application programming interface calls, one or more additional reservation requests for one or more particular types of electronic device from the requesting electronic device prior to the pre-order period.

13. The method of claim 12, further comprising:
determining that the reservation request and the one or more additional reservation requests occurred during the same session based on a common access token; and
in response to the determination, modifying the reservation table in the on-disk database by adding a row for each of the one or more additional reservation requests and storing each row for the one or more additional reservation requests as associated with the row for the reservation request.

14. The method of claim 9, wherein the particular type of electronic device comprises a mobile phone, a smart phone, a watch, a personal digital assistant (PDA), a media player, a wearable computer, a headset computer, a laptop computer, a tablet computer, or a notebook computer with specific characteristics.

15. The method of claim 14, wherein the specific characteristics comprise one or more of a color, a screen size, a memory size, or a speed of operation.

16. A method for reserving an electronic device that reduces the burden on an on-disk database, each step of the method performed by one or more application programming interfaces stored in a non-transitory memory of a server and executed by a processor of the server, the method comprising:
receiving during a session a first reservation request for a first particular type of electronic device from a requesting electronic device associated with a subscriber prior to a pre-order period;
accessing a count of available electronic devices for the first particular type of electronic device in an in-memory database, wherein the in-memory database stores a count of available electronic devices for each type of electronic device, and wherein the count of available electronic devices for each type of electronic device is initially determined based on information in a reservation table stored in an on-disk database;
based on accessing the count of available electronic devices for the first particular type of electronic device in the in-memory database, determining whether there is enough inventory of the first particular type of electronic device to accommodate the first reservation request;
in response to a determination that there is enough inventory of the first particular type of electronic device to accommodate the first reservation request based on accessing the count of available electronic devices for the first particular type of electronic device in the in-memory database, modifying the reservation table in the on-disk database by adding a row for the first reservation request that indicates the first particular type of electronic device as associated with the subscriber and a first priority status value;
in response to modifying the reservation table in the on-disk database for the first reservation request, decrementing the count of available electronic devices for the first particular type of electronic device stored in the in-memory database;
receiving during the session a second reservation request for a second particular type of electronic device from the requesting electronic device prior to the pre-order period;
accessing a count of available electronic devices for the second particular type of electronic device in the in-memory database;
based on accessing the count of available electronic devices for the second particular type of electronic device in the in-memory database, determining whether there is enough inventory of the second particular type of electronic device to accommodate the second reservation request;
determining that the first reservation request and the second reservation request occurred during the same session based on a common access token;
in response to a determination that there is enough inventory of the second particular type of electronic device to accommodate the second reservation request based on accessing the count of available electronic devices for the second particular type of electronic device in the in-memory database and in response to determining that the first reservation request and the second reservation request occurred during the same session based on the common access token, modifying the reservation table in the on-disk database by adding a row for the second reservation request and storing the row for the second reservation request as associated with the row for the first reservation request, wherein the row for the second reservation request comprises a second priority status value;

in response to modifying the reservation table in the on-disk database for the second reservation request, decrementing the count of available electronic devices for the second particular type of electronic device stored in the in-memory database; and sending one or more notifications to the subscriber indicating that the subscriber has reserved a place in line electronically for a pre-order of the first particular type of electronic device and a place in line electronically for a pre-order of the second particular type of electronic device.

17. The method of claim 16, further comprising subsequently receiving during the pre-order period at least one confirmation from the subscriber to proceed with at least one of the pre-order of the first particular type of electronic device or the pre-order of the second particular type of electronic device.

18. The method of claim 16, further comprising:

subsequently receiving a change request from the subscriber to switch the pre-order of the first particular type of electronic device to a different particular type of electronic device;

accessing the count of available electronic devices for the different particular type of electronic device in the in-memory database;

based on accessing the count of available electronic devices for the different particular type of electronic device in the in-memory database, determining whether there is enough inventory of the different particular type of electronic device to accommodate the change request;

in response to a determination that there is enough inventory of the different particular type of electronic device to accommodate the change request based on accessing the count of available electronic devices for the different particular type of electronic device in the in-memory database, modifying the row for the reservation request in the reservation table in the on-disk database based on the change request to indicate the different particular type of electronic device as associated with the subscriber; and in response to modifying the reservation table in the on-disk database, incrementing the count of available electronic devices for the particular type of electronic device and decrementing the count of available electronic devices for the different particular type of electronic device stored in the in-memory database.

19. The method of claim 16, wherein the particular type of electronic device comprises a mobile phone, a smart phone, a watch, a personal digital assistant (PDA), a media player, a wearable computer, a headset computer, a laptop computer, a tablet computer, or a notebook computer with specific characteristics.

20. The method of claim 19, wherein the specific characteristics comprise one or more of a color, a screen size, a memory size, or a speed of operation.

* * * * *